United States Patent
Hirabe

(10) Patent No.: US 6,862,462 B2
(45) Date of Patent: Mar. 1, 2005

(54) DIRECTIVITY CONTROL APPARATUS

(75) Inventor: Masashi Hirabe, Tokyo (JP)

(73) Assignee: NEC Corporation, Tokyo (JP)

( * ) Notice: Subject to any disclaimer, the term of this patent is extended or adjusted under 35 U.S.C. 154(b) by 399 days.

(21) Appl. No.: 10/141,987

(22) Filed: May 10, 2002

(65) Prior Publication Data

US 2002/0177963 A1 Nov. 28, 2002

(30) Foreign Application Priority Data

May 10, 2001 (JP) .................................... 2001-140549

(51) Int. Cl.⁷ ............................................. H04M 1/00
(52) U.S. Cl. ................................... 455/562.1; 455/522
(58) Field of Search ............................. 455/422.1, 440, 455/441, 561, 562.1, 103, 522

(56) References Cited

U.S. PATENT DOCUMENTS 5,887,262 A * 3/1999 Willhoff .................. 455/452.1
2002/0034967 A1 * 3/2002 Taniguchi et al. .......... 455/562

FOREIGN PATENT DOCUMENTS

| JP | 9-200115 | 7/1997 |
| JP | 10-70502 | 3/1998 |
| JP | 11-298400 | 10/1999 |
| JP | A 2000-209017 | 7/2000 |
| JP | 2000-224097 | 8/2000 |

* cited by examiner

Primary Examiner—Nguyen T. Vo
(74) Attorney, Agent, or Firm—Young & Thompson

(57) ABSTRACT

A reception unit receives signals from a plurality of radio terminals. A transmission unit transmits signals to the radio terminals. A direction determination unit determines the directions of the radio terminals viewed from the transmission unit on the basis of the signals received by the reception unit. A group selection unit distributes, by using a threshold, the transmission powers or downlink data transmission rates of radio terminals which transmit signals in a time-overlapping manner, thereby classifying the radio terminals into two groups. Then, the group selection unit selects a group having a smaller total number of radio terminals. A directivity pattern control unit controls a directivity pattern on the basis of the directions of the radio terminals determined by the direction determination unit.

11 Claims, 14 Drawing Sheets

| USER NO. | DOWNLINK DATA RATE | ARRIVAL DIRECTION |
|---|---|---|
| $U_1$ | $R_1 = R_{Lo}$ | $\theta_1$ |
| $U_2$ | $R_2 = R_{Hi}$ | $\theta_2$ |
| $U_3$ | $R_3 = R_{Mi}$ | $\theta_3$ |
| ⋮ | ⋮ | ⋮ |
| $U_M$ | $R_M = R_{Lo}$ | $\theta_M$ |

FIG. 3

| NO. | DOWNLINK DATA RATE | ARRIVAL DIRECTION |
|---|---|---|
| 1 | $R_1 = R_{Lo}$ | $\theta_1$ |
| 2 | $R_3 = R_{Mi}$ | $\theta_3$ |
| 3 | $R_7 = R_{Mi}$ | $\theta_7$ |
| ⋮ | ⋮ | ⋮ |
| $M_A$ | $R_M = R_{Lo}$ | $\theta_M$ |

| NO. | DOWNLINK DATA RATE | ARRIVAL DIRECTION |
|---|---|---|
| 1 | $R_2 = R_{Hi}$ | $\theta_2$ |
| 2 | $R_4 = R_{Hi}$ | $\theta_4$ |
| 3 | $R_5 = R_{Hi}$ | $\theta_5$ |
| ⋮ | ⋮ | ⋮ |
| $M_B$ | $R_{M-2} = R_{Hi}$ | $\theta_{M-2}$ |

FIG. 4A                FIG. 4B

| DIRECTION | DOWN LINK DATA RATE × NUMBER OF USERS |
|---|---|
| $\theta_1 \pm \Delta\theta/2$ | $R_1+R_3+R_7$ |
| $\theta_1+\Delta\theta \pm \Delta\theta/2$ | $R_2+R_5$ |
| $\theta_1+2\cdot\Delta\theta \pm \Delta\theta/2$ | $R_8$ |
| ⋮ | ⋮ |
| $\theta_1+Q\cdot\Delta\theta \pm \Delta\theta/2$ | $R_{42}$ |

| DIRECTION | DOWN LINK DATA RATE × NUMBER OF USERS |
|---|---|
| $\theta_1 + 2 \cdot \Delta\theta \pm \Delta\theta/2$ | $R_8$ |
| $\theta_1 + 5 \cdot \Delta\theta \pm \Delta\theta/2$ | $R_{21}$ |
| $\theta_1 + 7 \cdot \Delta\theta \pm \Delta\theta/2$ | $R_{28}$ |
| ...... | ...... |
| $\theta_1 + 0 \cdot \Delta\theta \pm \Delta\theta/2$ | $R_{42}$ |

FIG.9B

| DIRECTION | DOWN LINK DATA RATE × NUMBER OF USERS |
|---|---|
| $\theta_1 \pm \Delta\theta/2$ | $R_1 + R_3 + R_7$ |
| $\theta_1 + \Delta\theta \pm \Delta\theta/2$ | $R_2 + R_5$ |
| $\theta_1 + 3 \cdot \Delta\theta \pm \Delta\theta/2$ | $R_{21} + R_{32}$ |
| ...... | ...... |
| $\theta_1 + (0-5)\Delta\theta \pm \Delta\theta/2$ | $R_{40} + R_{41}$ |

| USER NO. | DOWNLINK DATA RATE | ARRIVAL DIRECTION |
|---|---|---|
| $U_1$ | $P_1$ | $\theta_1$ |
| $U_2$ | $P_2$ | $\theta_2$ |
| $U_3$ | $P_3$ | $\theta_3$ |
| ⋮ | ⋮ | ⋮ |
| $U_M$ | $P_M$ | $\theta_M$ |

FIG.12

| NO. | DOWNLINK DATA RATE | ARRIVAL DIRECTION |
|---|---|---|
| 1 | $P_1$ | $\theta_1$ |
| 2 | $P_3$ | $\theta_3$ |
| 3 | $P_7$ | $\theta_7$ |
| ⋮ | ⋮ | ⋮ |
| $M_A$ | $P_M$ | $\theta_M$ |

| NO. | DOWNLINK DATA RATE | ARRIVAL DIRECTION |
|---|---|---|
| 1 | $P_2$ | $\theta_2$ |
| 2 | $P_4$ | $\theta_4$ |
| 3 | $P_5$ | $\theta_5$ |
| ⋮ | ⋮ | ⋮ |
| $M_B$ | $P_{M-2}$ | $\theta_{M-2}$ |

FIG.13A      FIG.13B

| DIRECTION | DOWN LINK DATA RATE×NUMBER OF USERS |
|---|---|
| $\theta_1 \pm \Delta\theta/2$ | $P_1+P_3+P_7$ |
| $\theta_1+\Delta\theta \pm \Delta\theta/2$ | $P_2+P_5$ |
| $\theta_1+2\cdot\Delta\theta \pm \Delta\theta/2$ | $P_8$ |
| ⋮ | ⋮ |
| $\theta_1+Q\cdot\Delta\theta \pm \Delta\theta/2$ | $P_{42}$ |

FIG. 14

| DIRECTION | DOWN LINK DATA RATE×NUMBER OF USERS |
|---|---|
| $\theta_1+2\cdot\Delta\theta \pm \Delta\theta/2$ | $P_8$ |
| $\theta_1+5\cdot\Delta\theta \pm \Delta\theta/2$ | $P_{21}$ |
| $\theta_1+7\cdot\Delta\theta \pm \Delta\theta/2$ | $P_{28}$ |
| ⋮ | ⋮ |
| $\theta_1+Q\cdot\Delta\theta \pm \Delta\theta/2$ | $P_{42}$ |

FIG. 15A

| DIRECTION | DOWN LINK DATA RATE×NUMBER OF USERS |
|---|---|
| $\theta_1 \pm \Delta\theta/2$ | $P_1+P_3+P_7$ |
| $\theta_1+\Delta\theta \pm \Delta\theta/2$ | $P_2+P_5$ |
| $\theta_1+3\cdot\Delta\theta \pm \Delta\theta/2$ | $P_{21}+P_{32}$ |
| ⋮ | ⋮ |
| $\theta_1+(Q-5)\Delta\theta \pm \Delta\theta/2$ | $P_{40}+P_{41}$ |

DIRECTIVITY CONTROL APPARATUS

BACKGROUND OF THE INVENTION

The present invention relates to a directivity control apparatus for an adaptive antenna used in a radio station such as a radio base station.

A radio station such as a radio base station which communicates with a radio terminal such as a portable telephone uses an antenna for radiating radio waves. In general, radio waves radiated by the antenna propagate over the range of cells assigned to respective radio base stations. Radiating radio waves in a direction other than the direction of a radio terminal consumes power supplied to the antenna in transmitting radio waves.

Radio waves are generally radiated strongly in a direction in which a radio terminal exists, and weakly in a direction in which no radio terminal exists. An example of an antenna capable of adjusting the directivity of radio waves is an adaptive antenna having a directivity control apparatus.

There has conventionally been proposed a technique of installing an adaptive antenna in a radio base station and adjusting the transmission directivity of a signal transmitted from the adaptive antenna in accordance with the position of a moving radio terminal. In Japanese Patent Laid-Open No. 11-298400 (reference 1), a predetermined signal is transmitted to a radio terminal while the directivity of radio waves is changed in a radio base station. The directivity at which the reception power of a predetermined signal received by the radio terminal is strongest is used as the transmission directivity. A similar arrangement is also disclosed in Japanese Patent Laid-Open No. 09-200115 (reference 2).

In Japanese Patent Laid-Open No. 10-070502 (reference 3), the arrival direction of a reception signal which has arrived at a radio base station is estimated by calculation. The transmission directivity is so controlled as to radiate a transmission signal strongly in the estimated direction.

When a plurality of radio terminals exist within the cells of a radio base station, the radio base station simultaneously radiates radio waves to the radio terminals. Particularly if there are a plurality of radio terminals which perform communication by signals of the same or neighboring frequencies, radiated radio waves may interfere with each other, failing to ensure proper communication. As a technique of suppressing interference between radio waves, the adaptive antenna also receives a great deal of attention.

A radio base station using the adaptive antenna comprises a transmission directivity control apparatus for uniquely weighting outputs to a plurality of antenna elements which constitute an antenna, and adjusting the transmission directivity. To generate the transmission directivity pattern of a radio terminal, a main beam in a direction in which radio waves most strongly reach the radio terminal is directed. In addition, a null in a direction in which radio waves weakly reach other radio terminals is directed. The beam and null of the transmission directivity pattern can be directed to desired directions by adjusting antenna weights representing the weighting coefficients of outputs to respective antenna elements. Desired transmission directivity patterns are generated for respective radio terminals. This can suppress interference with radio waves propagating to other radio terminals to an extent that the nulls of respective transmission directivity patterns are directed even if radio waves are simultaneously radiated in transmission.

FIG. 18 shows a conventional transmission directivity control apparatus in a radio base station using an adaptive antenna. In the prior art, channels are assigned to first to Mth radio terminals (not shown) for the same time interval in the same frequency band by using CDMA (Code Division Multiple Access). In FIG. 17, a transmission directivity control apparatus 11 comprises first to Nth antenna elements $12_1$ to $12_N$ which are regularly aligned at an equal interval and transmit/receive radio waves. The antenna elements $12_1$ to $12_N$ are respectively connected to first to Nth transmission/reception demultiplexing circuits $13_1$ to $13_N$ for demultiplexing reception and transmission signals of radio waves. The transmission/reception demultiplexing circuits $13_1$ to $13_N$ are connected to a reception unit 14 for receiving reception signals, and a transmission unit 15 for transmitting transmission signals.

The reception unit 14 is constituted by first to Nth receivers $16_1$ to $16_N$ for amplifying and detecting reception signals output from the transmission/reception demultiplexing circuits $13_1$ to $13_N$, and first to Nth A/D (analog-to-digital) converters $17_1$ to $17_N$ for converting amplified/detected reception signals into digital signals. The transmission unit 15 is constituted by first to Nth D/A (digital-to-analog) converters $18_1$ to $18_N$ for converting transmission signals into analog signals, and first to Nth transmitters $19_1$ to $19_N$ for modulating and amplifying transmission signals converted into analog signals, and outputting the modulated/amplified signals to the transmission/reception demultiplexing circuits $13_1$ to $13_N$. The reception unit 14 and transmission unit 15 are connected to first to Mth transmission directivity generation units $20_1$ to $20_M$ for generating transmission directivities assigned to respective first to Mth radio terminals by the radio base station.

The first transmission directivity generation unit $20_1$ has a reception directivity pattern control unit $21_1$ for receiving reception signals converted into digital signals by the A/D converters $17_1$ to $17_N$ and generating a reception directivity pattern. The output of the reception directivity pattern control unit $21_1$ is connected to an antenna weight correction unit $22_1$ for correcting various errors when each antenna weight calculated in generating a reception directivity pattern is used to generate a transmission directivity pattern. The output of the antenna weight correction unit $22_1$ is connected to a transmission directivity pattern control unit $23_1$ for receiving each antenna weight obtained by correcting various errors, and generating a transmission directivity pattern. The output of the transmission directivity pattern control unit $23_1$ is connected to the D/A converters $18_1$ to $18_N$ for receiving transmission signals weighted by antenna weights calculated in generating a transmission directivity pattern.

Similar to the first transmission directivity generation unit $20_1$, the second to Mth transmission directivity generation units $20_2$ to $20_M$ comprise reception directivity pattern control units $21_2$ to $21_M$, antenna weight correction units $22_2$ to $22_M$, and transmission directivity pattern control units $23_2$ to $23_M$. The same arrangement as that of the transmission directivity control apparatus is also disclosed in Japanese Patent Laid-Open No. 2000-209017 (reference 4). The operations of the transmission directivity generation units $20_1$ to $20_M$ are the same, and the operation of the transmission directivity generation unit $20_1$ will be representatively explained.

The reception directivity pattern control unit $21_1$ receives the reception signals of the antenna elements $12_1$ to $12_N$ which have simultaneously received radio waves from the first to Mth radio terminals. The reception directivity pattern control unit $21_1$ executes despreading of multiplying the reception signals by a spreading code multiplied in the first radio terminal, and separates the reception signals of the first radio terminal from the remaining spread reception signals. The reception directivity pattern control unit $21_1$ calculates antenna weights corresponding to the reception signals from the first radio terminal. The reception directivity pattern control unit $21_1$ weights the reception signals by the antenna weights to generate a reception directivity pattern for the first radio terminal.

The antenna weight correction unit $22_1$ receives the respective antenna weights calculated by the reception directivity pattern control unit $21_1$. When the frequencies of reception and transmission signals are different from each other, the antenna weight correction unit $22_1$ corrects an antenna weight error caused by the frequency difference between the reception and transmission signals. At the same time, the antenna weight correction unit $22_1$ corrects antenna weight errors caused by amplitude and phase deviations generated in the reception unit 14 and transmission unit 15.

The transmission directivity pattern control unit $23_1$ weights a transmission signal $24_1$ from a transmission signal generation unit (not shown) by each corrected antenna weight to generate a transmission directivity pattern. The transmission directivity pattern control unit $23_1$ performs spreading of multiplying the transmission signal by a spreading code. The spread transmission signal is input to the D/A converters $18_1$ to $18_N$.

The transmission directivity pattern generated by the transmission directivity control apparatus 11 is generated using substantially the same antenna weight as each antenna weight calculated in generating a reception directivity pattern. The transmission directivity pattern is substantially the same as the reception directivity pattern. For example, when the reception directivity pattern control units $21_1$ to $21_M$ perform MMSE (Minimum Mean Square Error) adaptive control as a method of calculating each antenna weight, each antennal weight which directs a null to the direction of a large-reception-power signal is generated. A transmission directivity pattern generated in the transmission directivity control apparatus 11 directs a null to the direction of the large-reception-power signal. Since interference with radio waves from another radio terminal is small in the direction to which the null is directed, necessary transmission power to a radio terminal in this direction is decreased. As a result, interference with another radio terminal can be reduced.

In recent years, various contents obtained by downloading various data such as image data on the Internet from a radio terminal such as a portable telephone have increasingly being used. In this data communication, a downlink signal tends to have a larger capacity of data than an uplink signal, and higher data transmission rate is being required more and more. In general, the transmission power of radio waves becomes larger for higher data transmission rate. If the data transmission rates of uplink and downlink signals are different, the power distributions of the uplink and downlink signals are also different.

The conventional radio base station uses a reception directivity pattern optimized for the power distribution of the uplink signal as a transmission directivity pattern on the assumption that the transmission rates of the uplink and downlink signals are the same. Hence, the adaptive antenna effects cannot be fully enhanced to suppress interference.

To solve this problem, there is proposed a technique of making the direction to which the null is directed correspond to the power distribution of the downlink signal. In Japanese Patent Laid-Open No. 2000-224097 (reference 5), the null is directed to the large-transmission-power direction of a downlink signal. This reduces necessary transmission power to a radio terminal in this direction, and decreases interference in the small-transmission-power direction of another downlink signal.

The number of nulls which can be adjusted by the transmission directivity control apparatus is restricted by the number of antenna elements. When a plurality of radio terminals exist in addition to a radio terminal to which the main beam is directed, nulls may not be able to be directed toward all the remaining radio terminals. In some cases, the number of nulls exceeds the restricted number of nulls due to an increase in radio terminals which require data communication. In this case, nulls cannot be directed to radio terminals whose downlink signal transmission powers are large. In this case, large transmission power to radio terminals in directions to which no null is directed cannot be reduced. Radio interference with other small-transmission-power radio terminals cannot be suppressed.

The relationship between the main beam and the null has been described. Similar problems also occur in another case. When the directivity pattern is adjusted such that the radio intensity increases for target transmission radio terminals and decreases for other time-overlapping radio terminals, a plurality of radio terminals cannot be selected as other radio terminals to be selected.

SUMMARY OF THE INVENTION

It is an object of the present invention to provide a directivity control apparatus capable of adjusting a directivity pattern so as to selectively decrease the radio intensity for a plurality of time-overlapping radio terminals in adjusting the directivity pattern.

To achieve the above objects, according to the present invention, there is provided a directivity control apparatus comprising reception means for receiving signals from a plurality of radio terminals, transmission means for transmitting signals to the radio terminals, direction determination means for determining directions of the radio terminals viewed from the transmission means on the basis of the signals received by the reception means, group selection means for distributing, by using a threshold, transmission powers or downlink data transmission rates of radio terminals which transmit signals in a time-overlapping manner, thereby classifying the radio terminals into two groups, and then selecting a group having a smaller total number of radio terminals, and directivity pattern control means for controlling a directivity pattern on the basis of the directions of the radio terminals determined by the direction determination means so as to increase intensity of radio waves to a target transmission radio terminal and decrease the intensity of radio waves to other radio terminals which transmit signals in the time-overlapping manner and belong to a group selected by the group selection means.

BRIEF DESCRIPTION OF THE DRAWINGS

FIG. 3 is a table showing an example of a user distribution table processed in the database shown in FIG. 1;

FIGS. 4A and 4B are tables showing an example when the user distribution table shown in FIG. 3 is divided into A and B tables;

FIGS. 9A and 9B are tables showing an example when the user distribution table shown in FIG. 8 is divided into A and B tables;

FIG. 12 is a table showing an example of a user distribution table processed in the database of the second embodiment;

FIGS. 13A and 13B are tables showing an example when the user distribution table shown in FIG. 12 is divided into A and B tables;

FIG. 14 is a table showing an example of a user distribution table processed in a database according to a modification of the second embodiment;

FIGS. 15A and 15B are tables showing an example when the user distribution table shown in FIG. 14 is divided into A and B tables;

DESCRIPTION OF THE PREFERRED EMBODIMENTS

The present invention will be described in detail below with reference to the accompanying drawings.

<First Embodiment>

Figure 1:
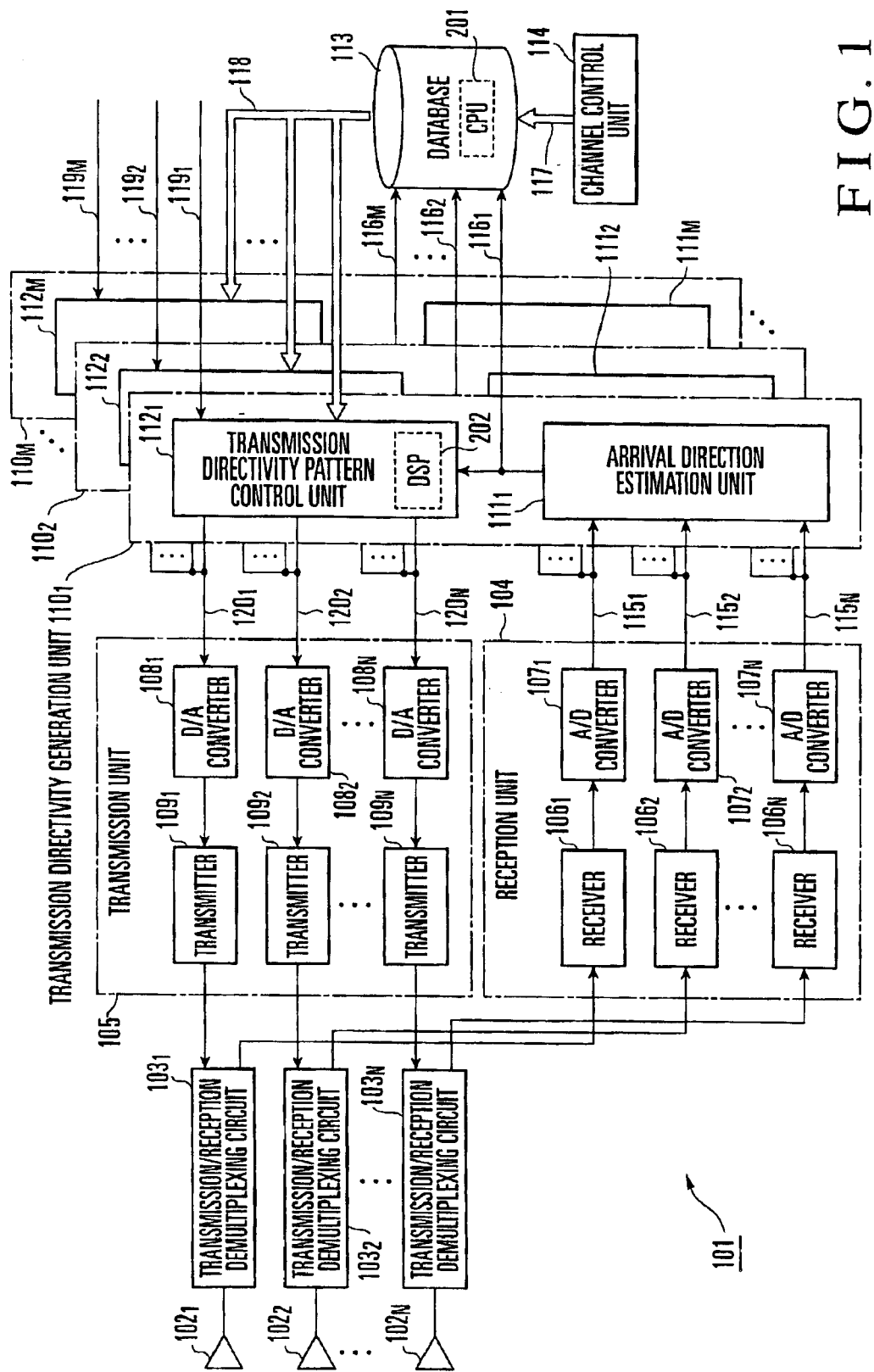
FIG. 1 is a block diagram showing a transmission directivity control apparatus in a radio base station using CDMA according to the first embodiment of the present invention.

FIG. 1 shows a transmission directivity control apparatus in a radio base station using CDMA according to the first embodiment of the present invention. In FIG. 1, a transmission directivity control apparatus 101 comprises first to Nth antenna elements $102_1$ to $102_N$ which are regularly aligned at an equal interval and transmit/receive radio waves. The antenna elements $102_1$ to $102_N$ are respectively connected to first to Nth transmission/reception demultiplexing circuits $103_1$ to $103_N$ for demultiplexing reception and transmission signals of radio waves. The transmission/reception demultiplexing circuits $103_1$ to $103_N$ are connected to a reception unit 104 for receiving reception signals, and a transmission unit 105 for transmitting transmission signals.

The reception unit 104 is constituted by first to Nth receivers $106_1$ to $106_N$ for amplifying and detecting reception signals output from the transmission/reception demultiplexing circuits $103_1$ to $103_N$ and first to Nth A/D (analog-to-digital) converters $107_1$ to $107_N$ for converting amplified/detected reception signals into digital signals. The transmission unit 105 is constituted by first to Nth D/A (digital-to-analog) converters $108_1$ to $108_N$ for converting transmission signals into analog signals, and first to Nth transmitters $109_1$ to $109_N$ for modulating and amplifying transmission signals converted into analog signals, and outputting the modulated/amplified signals to the transmission/reception demultiplexing circuits $103_1$ to $103_N$. The reception unit 104 and transmission unit 105 are connected to first to Mth transmission directivity generation units $110_1$ to $110_M$ for generating transmission directivities assigned to M radio terminals (to be referred to as users hereinafter) within the cells of the radio base station.

The first transmission directivity generation unit $110_1$ is made up of an arrival direction estimation unit $111_1$ for receiving reception signals from the A/D converters $107_1$ to $107_N$ and estimating the arrival direction of radio waves from the first user, and a transmission directivity pattern control unit $112_1$ for controlling the transmission directivity pattern of the first user. The output of the arrival direction estimation unit $111_1$ is connected to the transmission directivity pattern control unit $112_1$ and a database 113 such as a magnetic disk which stores data such as the arrival directions of radio waves of the first to Mth users.

Similar to the transmission directivity generation unit $110_1$, the second to Mth transmission directivity generation units $110_2$ to $110_M$ are constituted by second to Mth arrival direction estimation units $111_2$ to $111_M$ for receiving reception signals from the A/D converters $107_1$ to $107_N$ and estimating the arrival directions of radio waves from the second to Mth users, and second to Mth transmission directivity pattern control units $112_2$ to $112_M$ for controlling the transmission directivity patterns of the second to Mth users. The database 113 is connected to a channel control unit 114 for assigning a channel to a user, and the transmission directivity pattern control units $112_1$ to $112_M$.

The operation of the transmission directivity control apparatus 101 having this arrangement will be explained.

Reception signals received by the antenna elements $102_1$ to $102_N$ are input to the reception unit 104 via the transmission/reception demultiplexing circuits $103_1$ to $103_N$. In the reception unit 104, the reception signals are amplified and detected by the receivers $106_1$ to $106_N$, and converted into digital signals by the A/D converters $107_1$ to $107_N$. Each of first to Nth reception signals $115_1$ to $115_N$ converted into digital signals is branched by a user count M assigned by the channel control unit 114, and input to the arrival direction estimation units $111_1$ to $111_M$.

The arrival direction estimation units $111_1$ to $111_M$ are formed from DSPs (Digital Signal Processors) each having a CPU (Central Processing Unit), a storage medium such as a ROM (Read Only Memory) which stores a control program, and a RAM (Random Access Memory) serving as a work memory. The CPU performs various control operations in accordance with programs stored in the ROM.

The arrival direction estimation unit $111_1$ executes despreading in order to separate the reception signal of the first user from the reception signals $115_1$ to $115_N$. The despread reception signal is assigned a unique identification number so as to identify the user of the signal. Identification numbers are assigned for convenience by the transmission directivity control apparatus 101 to the first to Mth users assigned channels by the channel control unit 114 at the start of communication. As for the reception signal assigned the identification number, the arrival direction estimation unit $111_1$ estimates a direction from which the signal has come.

In estimating the arrival direction, the arrival direction estimation unit $111_1$ adopts a conventional beam former method of scanning the beam of a reception directivity pattern and detecting a direction in which reception power maximizes. First data $116_1$ representing an arrival direction $\theta_1$ estimated by the arrival direction estimation unit $111_1$ and a set user identification number $U_1$ is stored in the database 113, and at the same time input to the transmission directivity pattern control unit $112_1$.

When M users exist within the cells of the radio base station of the transmission directivity control apparatus 101, the M arrival direction estimation units $111_1$ to $111_M$ operate to perform the same processing. As the arrival direction estimation method, many known arrival direction estimation methods such as a MUSIC (MUltiple SIgnal Classification) algorithm can be employed.

The channel control unit 114 assigns downlink channels to the first to M users in accordance with a downlink data transmission rate required by each user. The channel control unit 114 is comprised of a CPU, a storage medium such as a ROM which stores a control program, and a RAM serving as a work memory, and executes predetermined channel control by a stored program method.

On a downlink channel, a transmittable data transmission rate is determined in advance in accordance with the data capacity of a signal transmitted to each user. That is, when the user starts communication, a downlink channel is assigned to the user on the basis of the data transmission rate so as to adjust the data capacity to a channel capacity which can be stored in the radio base station. In assigning a channel, a data transmission rate required by each user is set. Data 117 representing data transmission rates $R_1$ to $R_M$ and user identification numbers $U_1$ to $U_M$ in the downlink channels of the first to Mth users assigned by the channel control unit 114 are stored in the database 113.

Figure 2:
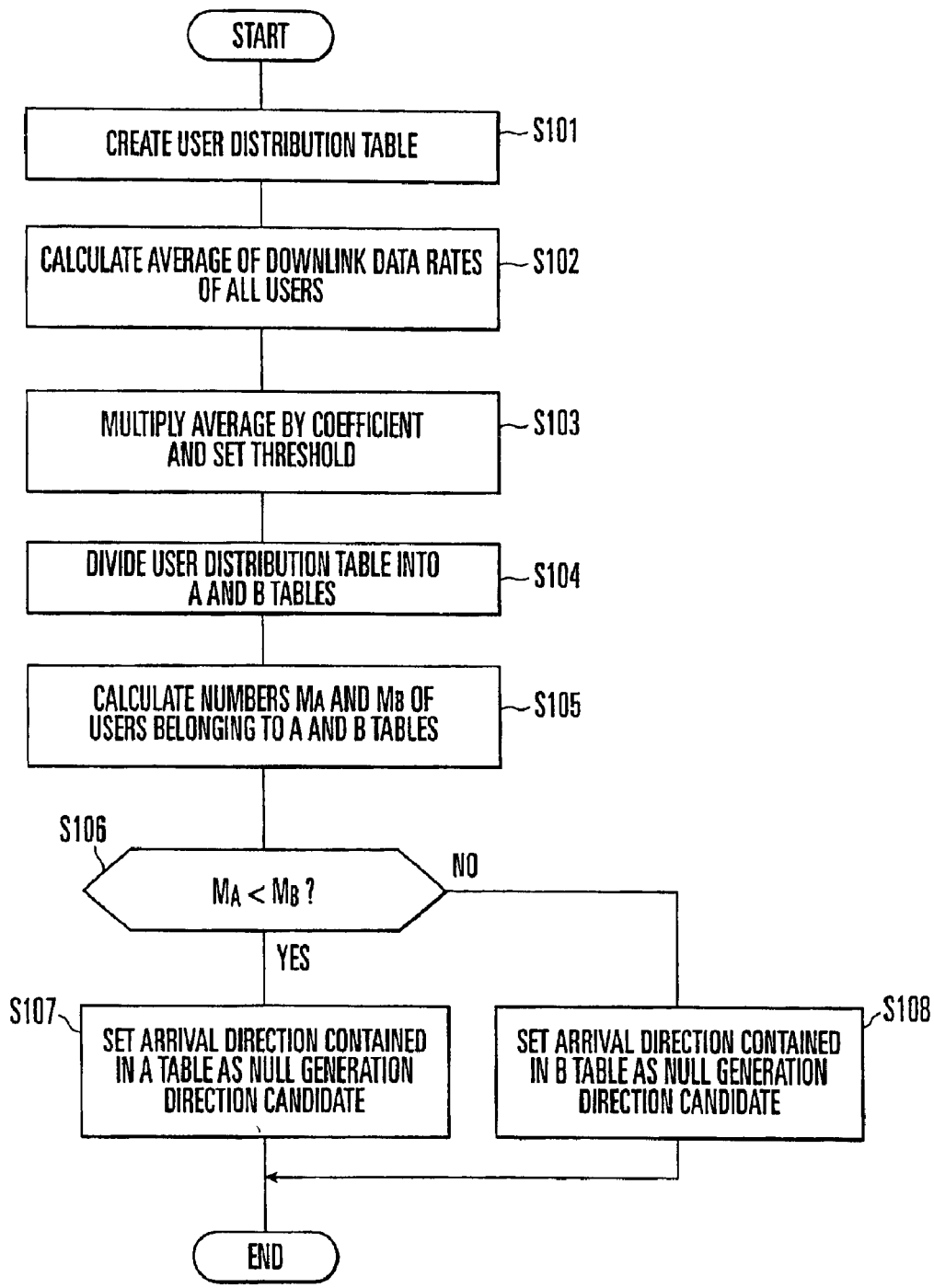
FIG. 2 is a flow chart showing data processing in a database shown in FIG. 1.

FIG. 2 shows a data processing flow in the database 113. The database 113 is made up of a CPU 201, a storage medium such as a ROM which stores a control program, and a RAM serving as a work memory. The database 113 performs predetermined control by a stored program method. The database 113 stores data representing arrival directions $\theta_1$ to $\theta_M$ which are estimated by the arrival direction estimation units $111_1$ to $111_M$ and correspond to the first to Mth users, and user identification numbers $U_1$ to $U_M$. The database 113 also stores data representing data rates $R_1$ to $R_M$ on the downlink channels of the first to Mth users assigned by the channel control unit 114, and the user identification numbers $U_1$ to $U_M$. A user distribution table is crated from these data (step S101).

FIG. 3 shows an example of a data table processed by the database. In FIG. 3, the distribution of downlink data transmission rates required by users for respective arrival directions is stored as a user distribution table 201 in the table form. "USER No." in the user distribution table 201 represents the user identification numbers $U_1$ to $U_M$ assigned by the arrival direction estimation units $111_1$ to $111_M$. The second field "DOWNLINK DATA RATE" represents the data transmission rate of a downlink transmission signal assigned by the channel control unit 114. In the first embodiment, $R_{Hi}$ represents a high data transmission rate; $R_{Mi}$, an intermediate data transmission rate; and $R_{Lo}$, a low data transmission rate. The third field "ARRIVAL DIRECTION" represents reception signal arrival directions estimated by the arrival direction estimation units $111_1$ to $111_M$.

Referring back to FIG. 2, the average of the data transmission rates of downlink channels is calculated from the data rates $R_1$ to $R_M$ in the user distribution table 201 (step S102). The calculated average is multiplied by a coefficient, and the product is set as a threshold (step S103). This coefficient is an arbitrary coefficient set in advance as an index optimal for use environment conditions such as the number of users and the user distribution. In the first embodiment, the threshold is experimentally determined for the average user distribution of the base station by using as a reference the average of data transmission rates for all the users. At first, the average is set as a default value, and perturbation is conducted to determine a threshold so as to minimize the total transmission power of an average base station. The total transmission power of the base station is observed every day.

By using this threshold, the user distribution table 201 is divided into two, A and B tables (step S104). Note that the mode may be calculated instead of the average in step S102, and the calculated mode may be multiplied by a coefficient to obtain a threshold in step S103.

FIGS. 4A and 4B show an example when the user distribution table is divided into A and B tables. The A and B tables are attained using as the threshold a value between the data transmission rates $R_{Hi}$ and $R_{Mi}$. In an A table 202 shown in FIG. 4A, "No." represents a number assigned for convenience. "DOWNLINK DATA RATE" represents the data transmission rates $R_{Mi}$ and $R_{Lo}$ lower than the threshold. Similar to the table in FIG. 3, "ARRIVAL DIRECTION" represents an estimated reception signal arrival direction. A B table 203 shown in FIG. 4B is identical to the A table 202 except that "DOWNLINK DATA RATE" represents the data transmission rate $R_{Hi}$ higher than the threshold.

Referring back to FIG. 2, a number $M_A$ of users belonging to the A table 202 and a number $M_B$ of users belonging to the B table 203 are obtained (step S105), and the number $M_A$ of users and the number $M_B$ of users are compared (step S106). If the number $M_A$ of users is smaller than the number $M_B$ of users, arrival directions contained in the A table 202 representing the number $M_A$ of users are set as null generation direction candidates (step S107). If the number $M_A$ of users is larger than the number $M_B$ of users, arrival directions contained in the B table 203 representing the number $M_B$ of users are set as null generation direction candidates (step S108).

In this manner, the directions of users who demand downlink transmission signals at data transmission rates belonging to a low-density distribution out of the downlink data transmission rate distribution of the first to Mth users are defined as null generation directions. The coefficient of the threshold prevents the number $M_A$ of users and the number $M_B$ of users from being equal to each other. After processing, null generation direction candidates 118 (FIG. 1) from the database 113 are output to the transmission directivity pattern control units $112_1$ to $112_M$.

Figure 17A:
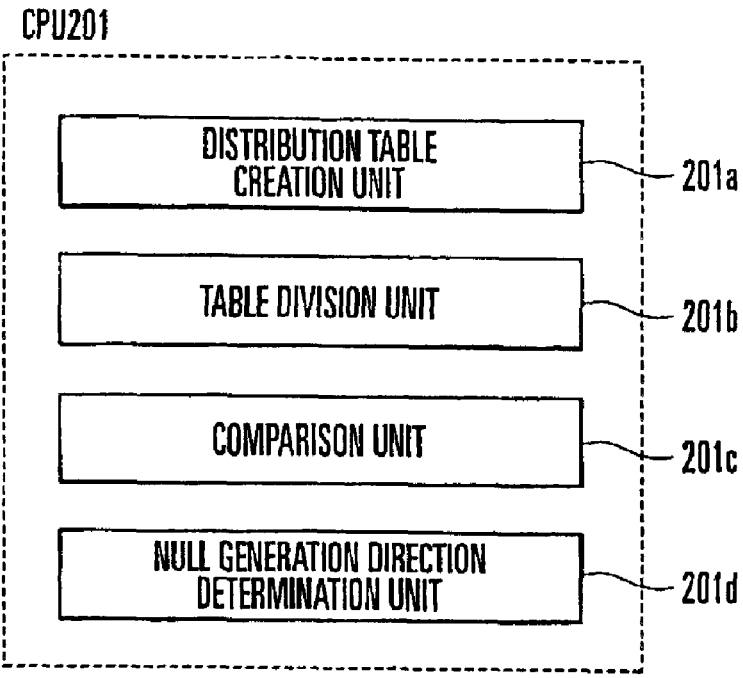
FIG. 17A is a functional block diagram showing a CPU which constitutes the database shown in FIG. 1.

FIG. 17A shows the functional block of the CPU 201. In FIG. 17A, the CPU 201 comprises functional blocks: a distribution table creation unit 201a for performing processing in step S101, a table division unit 201b for performing processing in steps S102 to S104, a comparison unit 201c for performing processing in steps S105 and S106, and a null generation direction determination unit 201d for performing processing in steps S107 and S108. The CPU 201 for executing database control is installed in the database 113, but may be arranged outside the database 113.

Each of the transmission directivity pattern control units $112_1$ to $112_M$ is formed from a DSP 202 having a CPU, a storage medium such as a ROM which stores a control program, and a RAM serving as a work memory. The operations of the transmission directivity pattern control units $112_1$ to $112_M$ are the same, and only the operation of the transmission directivity pattern control unit $112_1$ will be explained.

The transmission directivity pattern control unit $112_1$ calculates each antenna weight for generating the transmission directivity pattern of the first user on the basis of the data $116_1$ representing the arrival direction of the first user, and the null generation direction candidate 118 output from the database 113.

Figure 5:
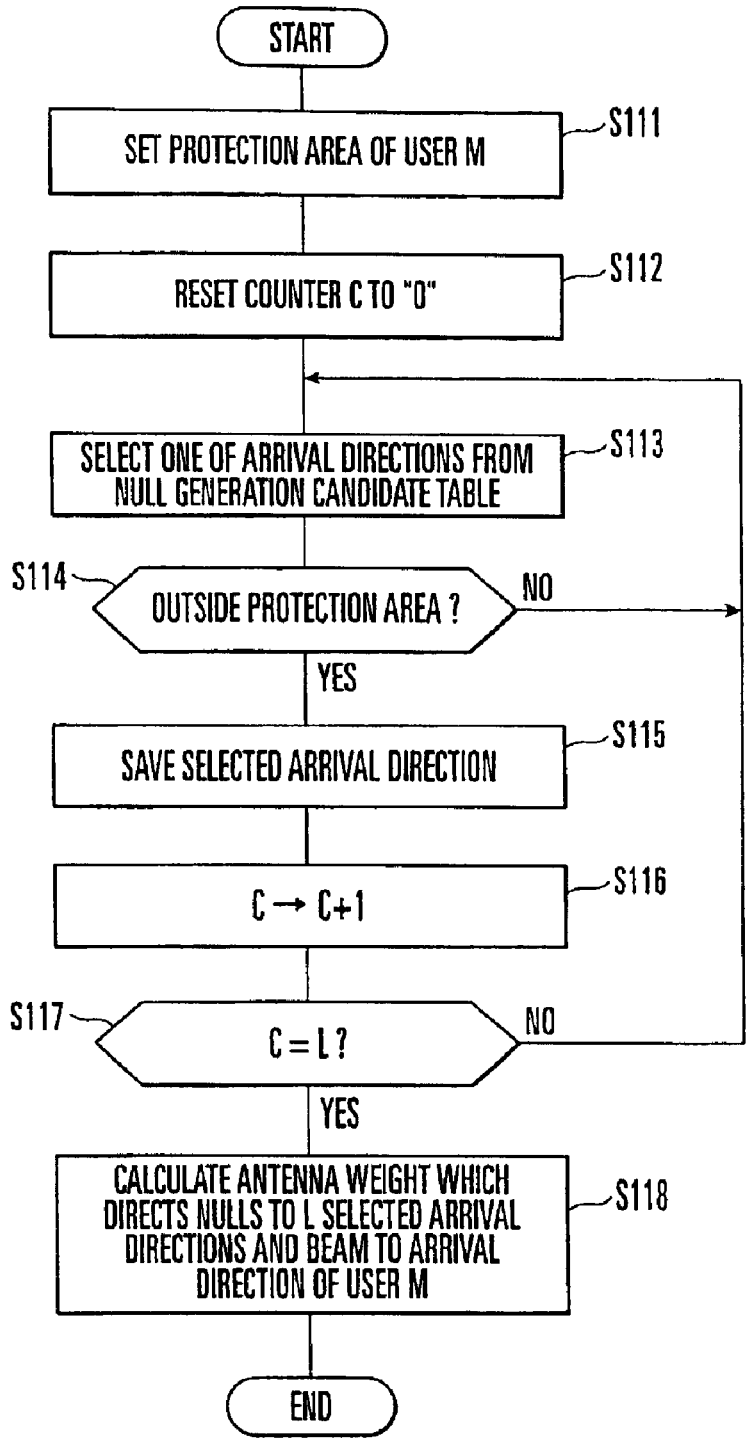
FIG. 5 is a flow chart showing antenna weight calculation processing in a transmission directivity pattern control unit shown in FIG. 1.

FIG. 5 shows a processing flow of calculating an antenna weight in the transmission directivity pattern control unit $112_1$. The transmission directivity pattern control unit $112_1$ calculates a protection area H on the basis of input of the arrival direction $\theta_1$ estimated by the arrival direction estimation unit $111_1$ (step S111):

$$H=\theta_1 \pm \Delta\theta/2 \quad (1)$$

$\Delta\theta$ in equation (1) is given by $$\Delta\theta = k \cdot \theta_{BW} \quad (2)$$

The numerical value $\theta_{BW}$ in equation (2) is the half power angle of an adaptive antenna in the radio base station. The coefficient k is generally a value of "2" to "3", but can take various values depending on the characteristics of the apparatus.

After the protection area H is set, a clock count C of a counter (not shown) for counting clocks is reset to a numerical value "0" (step S112). One arrival direction is selected at random from null generation direction candidates selected in steps S107 and S108 (step S113). Whether the selected arrival direction is an angle positioned outside or inside the protection area H is checked (step S114). If the arrival direction falls outside the protection area H, the selected arrival direction is saved (step S115). If the arrival direction falls within the protection area H, processing in steps S113 and S114 is repeated.

After the arrival direction is saved in step S115, the clock count "C" of the counter is incremented (step S116), and whether the clock count "C" reaches a preset value L is checked (step S117). If YES in step S117, antenna weights which have nulls in L selected arrival directions and generate a main beam in the arrival direction of the first user are calculated (step S118). If NO in step S117, processing in steps S113 to S117 is repeated.

Figure 17B:
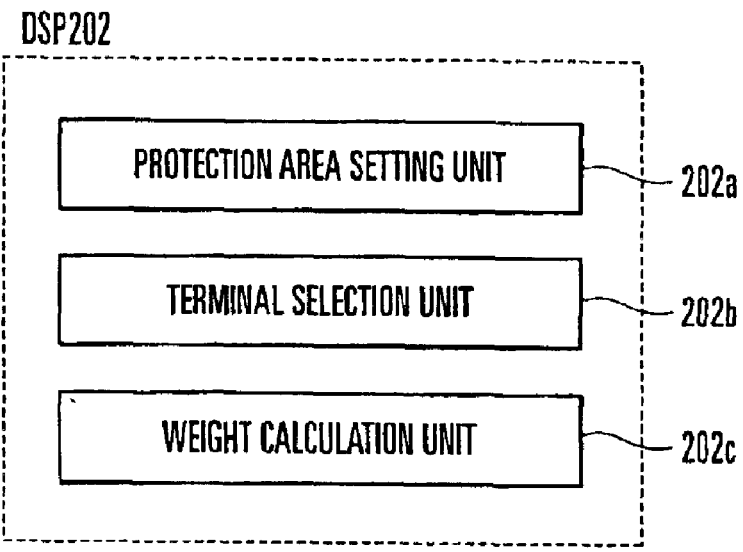
FIG. 17B is a functional block diagram showing a DSP which constitutes the transmission directivity pattern control unit shown in FIG. 1.
Figure 18:
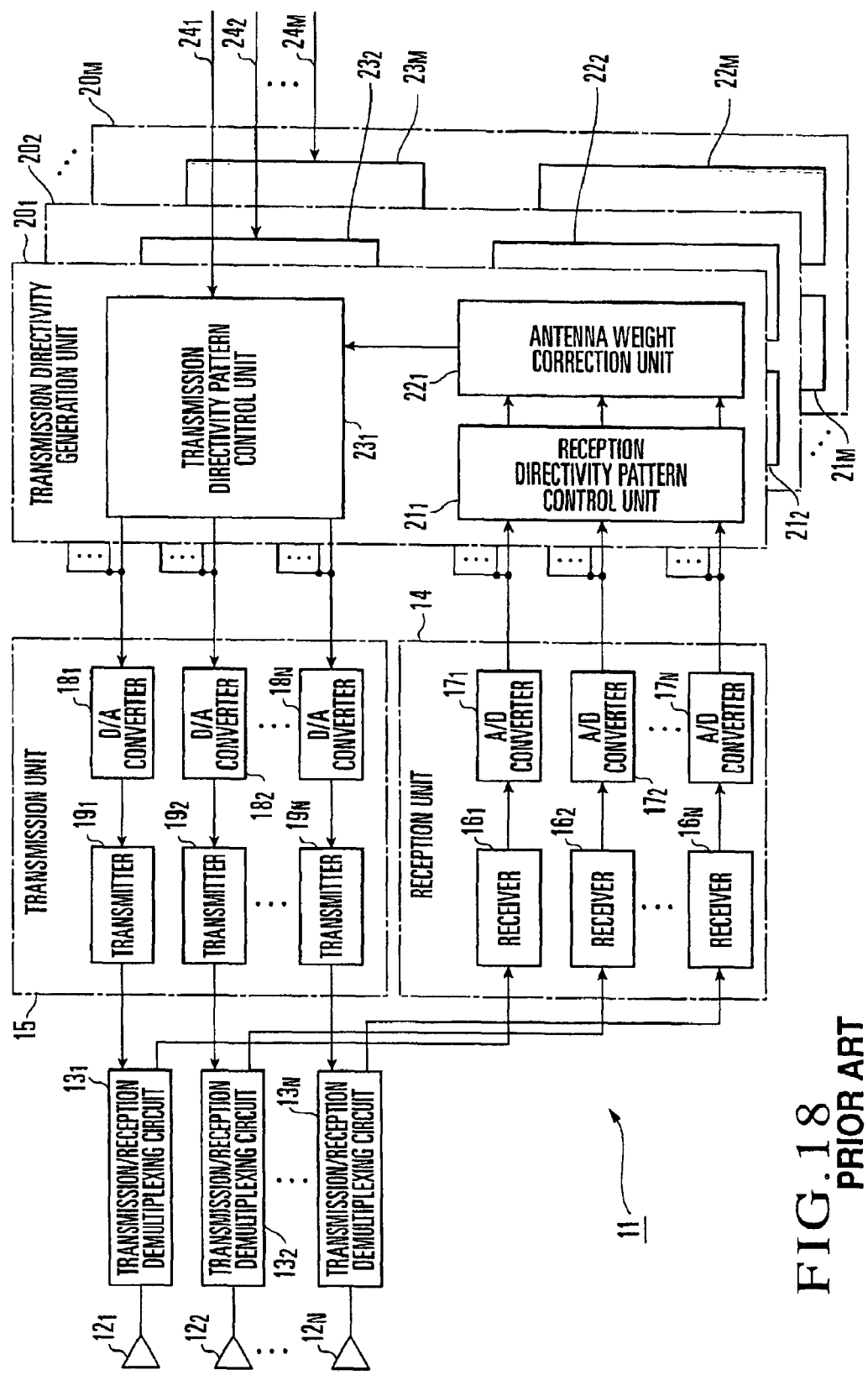
FIG. 18 is a block diagram showing a conventional transmission directivity control apparatus in a radio base station using an adaptive antenna.

FIG. 17B shows the functional block of the DSP (CPU) 202 of the transmission directivity pattern control unit $112_1$. In FIG. 17B, the DSP 202 has functional blocks: a protection area setting unit 202a for performing processing in step S111, a terminal selection unit 202b for performing processing in steps S113 to S117, and a weight calculation unit 202c for performing processing in step S118.

The preset value L will be explained. In the adaptive antenna, a predetermined restriction is posed on a freely adjustable null direction. This is called the degree of freedom of the antenna. Letting N (N is a positive integer) be the number of antenna elements, the degree of freedom of the antenna is given by $$\text{Degree of Freedom of Antenna} = N-1 \quad (3)$$

When the main beam generation direction is adjusted, the degree of freedom of the antenna is decremented by "1" and is given by $$\text{Degree of Freedom of Antenna} = N-2 \quad (4)$$

As represented by equations (3) and (4), the direction in which the null can be freely controlled suffers the predetermined restriction. The maximum value of the preset value L is the degree of freedom of the antenna given by equation (4).

Arrival directions falling within the protection area H are not selected as null generation directions on the basis of the protection area H given by equation (1). In other words, no null is generated to users present in the protection area H of the first user. In this case, no null is generated within a predetermined angle including the direction of the first user. A decrease in the antenna gain of the main beam of the transmission directivity pattern of the first user can be reduced, and an increase in transmission power can be prevented. Accordingly, interference with another user due to an increase in transmission power can be reduced.

Figure 6:
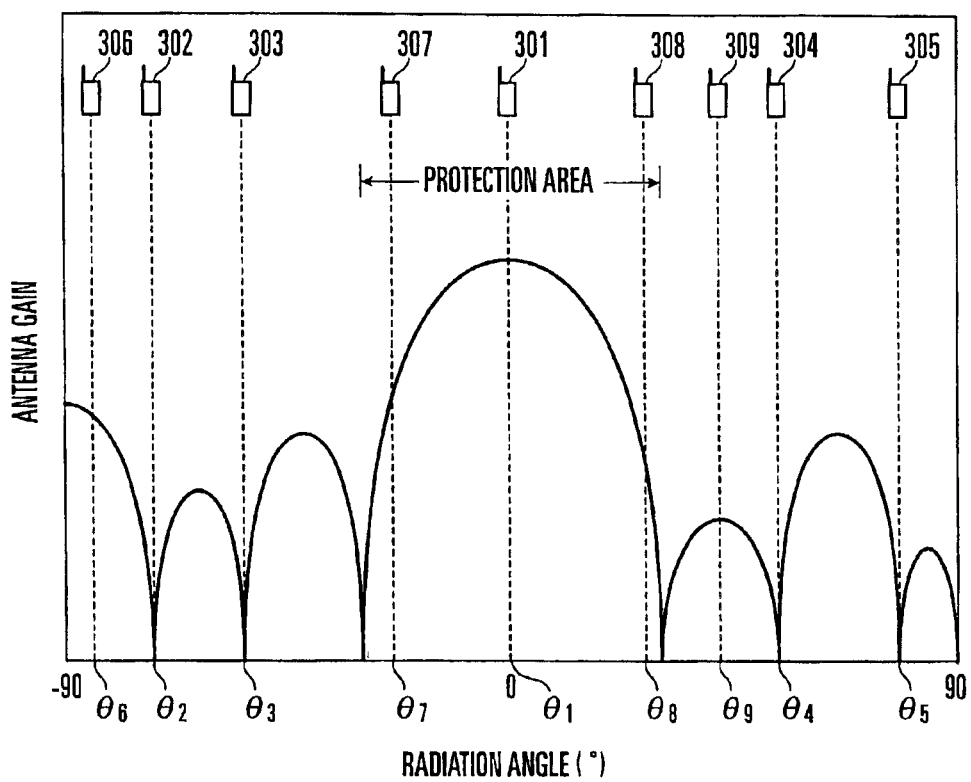
FIG. 6 is a view showing the transmission directivity pattern of one user generated in the transmission directivity pattern control unit shown in FIG. 1.

FIG. 6 shows the transmission directivity pattern of the first user generated by the transmission directivity pattern control unit. In FIG. 6, $\theta_1$ represents a direction in which a first user 301 exists out of a plurality of users within the cells of the radio base station; $\theta_2$ to $\theta_5$, directions which are selected as null generation direction candidates and in which second to fifth users 302 to 305 exist; and $\theta_6$ to $\theta_9$, directions which are not selected as null generation directions and in which sixth to ninth users 306 to 309 exist.

In FIG. 6, all the null generation direction candidates falling within the protection area H are not selected as null generation direction candidates. Since user directions falling within the protection area H are not set as null generation direction candidates, a decrease in the antenna gain of the main beam can be reduced. Antenna weights are so obtained as to generate the transmission directivity pattern of the first user in which the main beam is directed to the arrival direction $\theta_1$ and nulls are directed to angles $\theta_2, \theta_3, \ldots, \theta_5$.

Referring back to FIG. 1, to calculate each antenna weight by the transmission directivity pattern control unit $112_1$, a desired wave/interference wave distribution is simulated by signal processing which is as a conventional antenna weight calculation method, and the MMSE algorithm is applied to a simulation signal. In the transmission directivity pattern control unit $112_1$ a transmission signal $119_1$ from a transmission signal generation unit (not shown) is weighted by each calculated antenna weight to generate the transmission directivity pattern of the first user. Transmission signals weighted by the transmission directivity pattern control unit $112_1$ undergo spread of multiplying them by the spreading code of a channel assigned by the channel control unit 114. The resultant signals are output as transmission signals $120_1$ to $120_N$ to the D/A converters $108_1$ to $108_N$.

The same processing is done by the M transmission directivity pattern control units $112_1$ to $112_M$ when M users exist within the cells of the radio base station of the transmission directivity control apparatus 101.

Figures 7, 8:
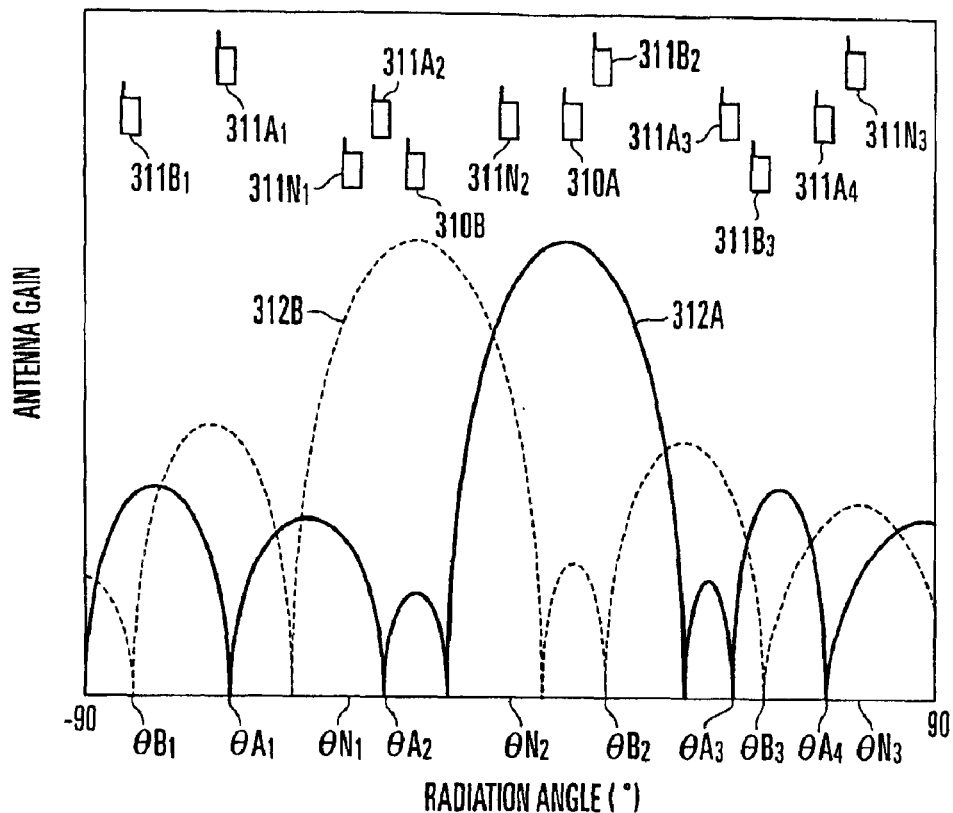
FIG. 7 is a view showing the transmission directivity patterns of a plurality of users generated in the transmission directivity pattern control unit shown in FIG. 1.
FIG. 8 is a table showing an example of a user distribution table processed in a database according to a modification of the first embodiment.

FIG. 7 shows transmission directivity patterns generated by the transmission directivity pattern control units corresponding to a plurality of users. FIG. 7 shows the transmission directivity patterns of two users 310A and 310B out of a plurality of users present within the cells of the radio base station. $\theta A$ and $\theta B$ represent the directions of users 311A and 311B selected as null generation direction candidates, and $\theta N$ represents the direction of a user 311N not selected as a null generation direction. The transmission directivity pattern of the user 310A is a directivity pattern 312A generated by directing the main beam toward the user 310A. At this time, in step S113 of FIG. 5, a null generation direction is selected at random for the user 310A. A null is generated to the user 311A present in the direction θA selected at random from selected null generation direction candidates.

Similarly, the transmission directivity pattern of the user 310B is a directivity pattern 312B generated by directing the main beam toward the user 310B. A null is generated to the user 311B present in the direction θB selected at random from selected null generation direction candidates.

The direction of a null $θA_3$ among the arrival directions of users will be described to explain the situation of a direction in which the null is directed. The direction $θA_3$ to which the null is generated is the direction of a user $311A_3$ selected from null generation direction candidates in generating a transmission directivity pattern for the user 310A. The null $θA_3$ prevents generation of any null to the user 310B because the user 310B is not selected as a null generation direction. Even if many users exist, this processing is performed for all the users. The possibility of directing a null toward the direction $θA_3$ of the user $311A_3$ by the transmission directivity patterns of all the users is decreased. However, some users selected as null generation direction candidates direct nulls to the direction $θA_3$.

As described above, a predetermined restriction is posed on a freely adjustable null direction. In the first embodiment, a null generation direction is selected at random from null generation direction candidates under the restriction on the degree of freedom. Even if the number of interference waves arriving at the radio base station exceeds the degree of freedom of the adaptive antenna, nulls equivalently having a depth to a certain degree are generated by generating transmission directivity patterns for a plurality of radio terminals. For example, as shown in FIG. 7, the direction to the user $311A_3$ is not selected as a null generation direction in generation of a transmission directivity pattern for the user 310B, but is selected as a null generation direction candidate for each user. As far as the direction is selected as a null generation direction candidate, this direction may be selected at high possibility as a null generation direction with respect to the transmission directivity pattern of another user. As a result, interference with many users can be effectively suppressed.

Referring back to FIG. 1, the transmission signals $120_1$ to $120_N$ output from the transmission directivity pattern control units $112_1$ to $112_M$ are input to the transmission unit 105. The transmission signals are converted into analog signals by the D/A converters $108_1$ to $108_N$, and modulated and amplified by the transmitters $109_1$ to $109_N$. The amplified transmission signals are transmitted from the antenna elements $102_1$ to $102_N$ via the transmission/reception demultiplexing circuits $103_1$ to $103_N$.

<Modification of First Embodiment>

FIG. 8 shows a modification of the database. In a user distribution table 204 according to the modification, "DIRECTION" represents an angular range when the direction in which the directivity can be adjusted by the transmission directivity control apparatus 101 of the first embodiment is equally divided into Q.

The angular range is defined by $$\text{Angular Range} = θ_1 ± Δθ/2 \quad (5)$$

Δθ in equation (5) is given by equation (2).

In this modification, angular ranges after equal division in the field "DIRECTION" of the user distribution table 204 are values calculated by sequentially adding Δθ to equation (5). "DOWNLINK DATA RATE X NUMBER OF USERS" is a value calculated by adding the data transmission rates of downlink transmission signals assigned by the channel control unit 114 for users present within each range.

FIGS. 9A and 9B show an example when the user distribution table 204 is divided into A and B tables. In A and B tables 205 and 206, "DIRECTION" and "DOWNLINK DATA RATE X NUMBER OF USERS" represent the same items as those in FIG. 8. In this example, the threshold is experimentally determined for the average user distribution of the base station by using as a reference the average of data transmission rates for all the angular ranges. Similar to the first embodiment, the average is first set as a default value, and perturbation is conducted to determine a threshold so as to minimize the total transmission power of an average base station. The total transmission power of the base station is observed every day. The A table 205 shows a case in which a total of the downlink data transmission rates of users present within each of Q divided angular ranges is smaller than the threshold. To the contrary, the B table 206 shows a case in which a total of the downlink data transmission rates of users present within each of Q divided angular ranges is larger than the threshold.

Processing in the database 113 is the same as that in the first embodiment, and a transmission directivity pattern is generated by the same operation as that in the first embodiment. In addition to the effects of the first embodiment, the modification effectively suppresses interference with many radio terminals because nulls are directed to radio terminals concentrated in a predetermined direction.

<Second Embodiment>

Figure 10:
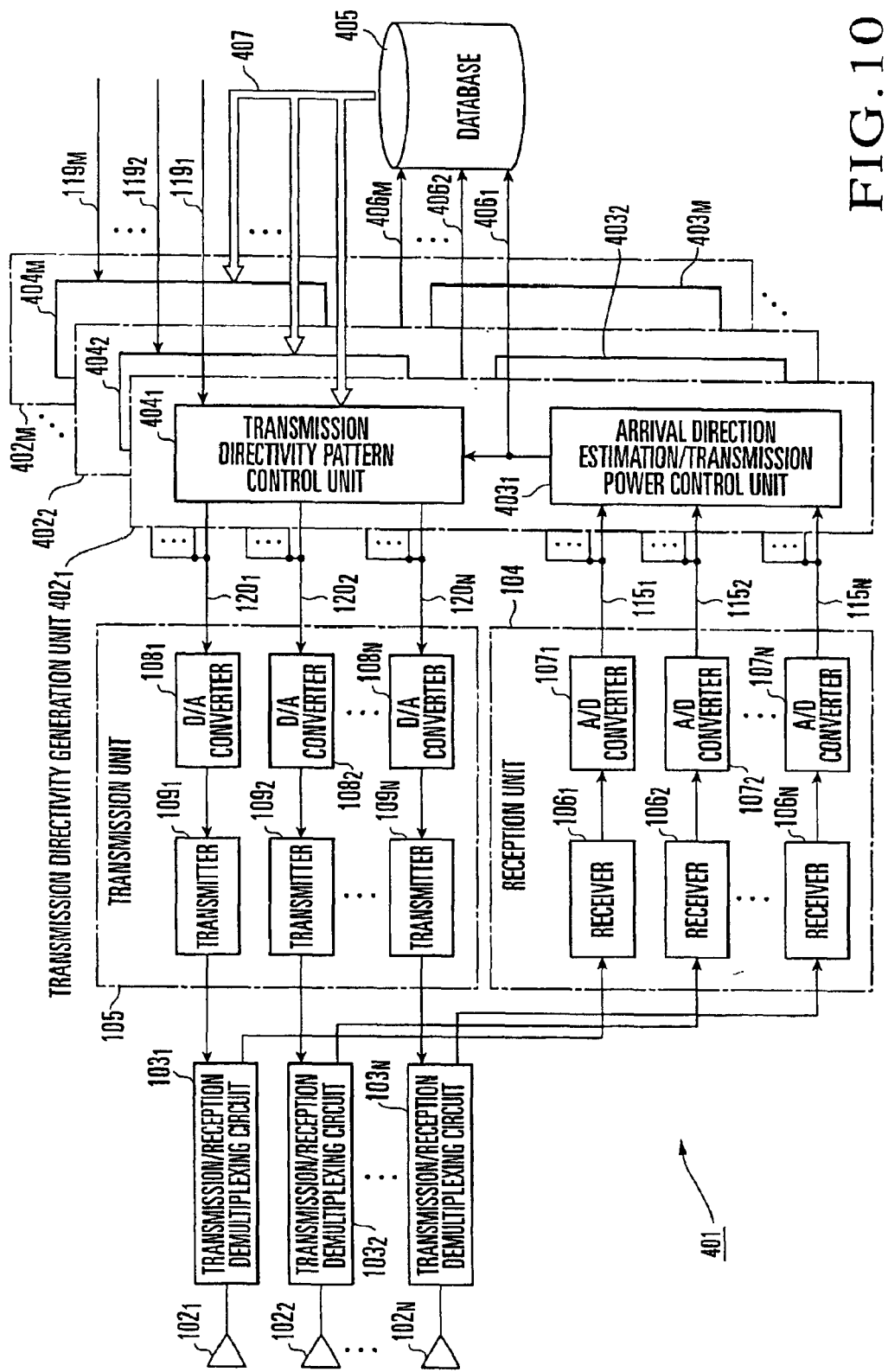
FIG. 10 is a block diagram showing a transmission directivity control apparatus in a radio base station using CDMA according to the second embodiment of the present invention.

FIG. 10 shows a transmission directivity control apparatus in a radio base station using CDMA according to the second embodiment of the present invention. In a transmission directivity control apparatus 401 of the second embodiment, the same reference numerals as in the transmission directivity control apparatus 101 of the first embodiment denote the same parts, their operations are substantially the same, and a detailed description thereof will be omitted. In the second embodiment, transmission directivity generation units $402_1$ to $402_M$ replace the transmission directivity generation units $110_1$ to $110_M$ in the first embodiment.

The transmission directivity generation units $402_1$ to $402_M$ are respectively constituted by arrival direction estimation/transmission power control units $403_1$ to $403_M$ for receiving reception signals from A/D converters $107_1$ to $107_N$ estimating the arrival directions of the first to Mth users, and controlling downlink transmission power, and transmission directivity pattern control units $404_1$ to $404_M$ for controlling the transmission directivity patterns of the first to Mth users. The outputs of the arrival direction estimation/transmission power control units $403_1$ to $403_M$ are connected to a database 405 such as a magnetic disk which stores output data, and the transmission directivity pattern control units $404_1$ to $404_M$. The database 405 is connected to the transmission directivity pattern control units $404_1$ to $404_M$.

The arrival direction estimation/transmission power control units $403_1$ to $403_M$ are formed from DSPs each having a CPU, a storage medium such as a ROM which stores a control program, and a RAM serving as a work memory.

The arrival direction estimation/transmission power control units $403_1$ to $403_M$ execute despreading for input reception signals $115_1$ to $115_N$, similar to the first embodiment. The arrival direction estimation/transmission power control units $403_1$ to $403_M$ assign identification numbers to the reception signals $115_1$ to $115_N$, and estimate their arrival directions. The format of a reception signal discriminated from other reception signals designates the transmission power of a downlink transmission signal. Based on these reception signals, the arrival direction estimation/transmission power control units $403_1$ to $403_M$ extract downlink transmission powers designated by users.

Data $406_1$ to $406_M$ representing user identification numbers $U_1$ to $U_M$ output from the arrival direction estimation/transmission power control units $403_1$ to $403_M$ arrival directions $\theta_1$ to $\theta_M$, and downlink transmission powers $P_1$ to $P_M$ are stored in the database 405.

Figure 11:
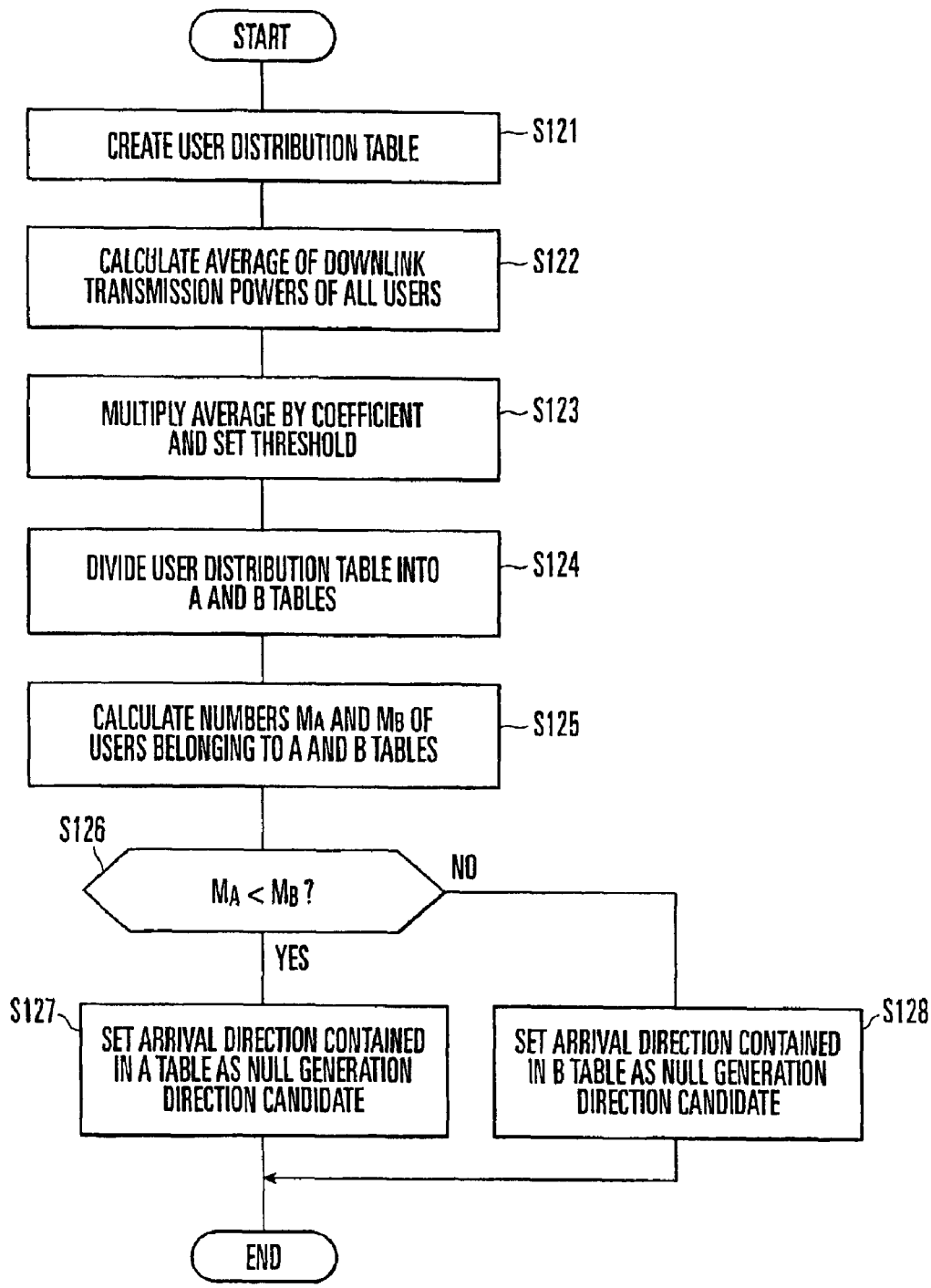
FIG. 11 is a flow chart showing data processing in a database shown in FIG. 10.

FIG. 11 shows a data processing flow in the database 405. The database 405 is made up of a CPU, a storage medium such as a ROM which stores a control program, and a RAM serving as a work memory. The database 405 performs predetermined control by a stored program method. The database 405 creates a user distribution table in which the stored user identification numbers $U_1$ to $U_M$, arrival directions $\theta_1$ to $\theta_M$ and downlink transmission powers $P_1$ to $P_M$ correspond to each other (step S121).

FIG. 12 shows an example of a table structure processed by the database. In the second embodiment, the distribution of the downlink transmission powers of users is stored as a user distribution table 207 in the table form. In the user distribution table 207, "USER No." represents the user identification numbers $U_1$ to $U_M$ assigned by the arrival direction estimation/transmission power control units $403_1$ to $403_M$. "DOWNLINK DATA RATE" represents the downlink transmission powers $P_1$ to $P_M$ extracted by the arrival direction estimation/transmission power control units $403_1$ to $403_M$. "ARRIVAL DIRECTION" represents reception signal arrival directions from users who demand downlink transmission powers listed up in "DOWNLINK DATA RATE".

In FIG. 11, the average of the transmission powers of downlink channels is calculated from the arrival directions $\theta_1$ to $\theta_M$, user identification numbers $U_1$ to $U_M$, and downlink transmission powers $P_1$ to $P_M$ stored in the user distribution table 207 (step S122). The calculated average is multiplied by a coefficient to set a threshold (step S123). This coefficient is an arbitrary coefficient which flexibly copes with the use environment, similar to the first embodiment. By using this threshold, the user distribution table 207 is divided into two, A and B tables (step S124). Note that the mode may be used in place of the average.

FIGS. 13A and 13B show an example when the user distribution table is divided into A and B tables. In an A table 208 shown in FIG. 13A, "No." represents a number assigned for convenience. "DOWNLINK DATA RATE" represents a data transmission power lower than the threshold. "ARRIVAL DIRECTION" is the same as that of FIG. 12, and a description thereof will be omitted. A B table 209 shown in FIG. 13B is identical to the A table 208 except that "DOWNLINK DATA RATE" represents a downlink transmission power higher than the threshold.

A number $M_A$ of users belonging to the A table 208 and a number $M_B$ of users belonging to the B table 209 are obtained (step S125), and the number $M_A$ of users and the number $M_B$ of users are compared (step S126). If the number $M_A$ of users is smaller than the number $M_B$ of users, arrival directions contained in the A table 208 representing the number $M_A$ of users are set as null generation direction candidates (step S127). If the number $M_A$ of users is larger than the number $M_B$ of users, arrival directions contained in the B table 209 representing the number $M_B$ of users are set as null generation direction candidates (step S128). In this way, null generation direction candidates are selected from the data $406_1$ to $406_M$ stored in the database 405. The coefficient of the threshold prevents the number $M_A$ of users and the number $M_B$ of users from being equal to each other.

Data 407 representing the selected null generation direction candidates are respectively input to the transmission directivity pattern control units $404_1$ to $404_M$. Processing in the transmission directivity pattern control units $404_1$ to $404_M$ is the same as that in the first embodiment, and the subsequent operation is also the same.

<Modification of Second Embodiment>

FIG. 14 shows a modification of the database in the second embodiment. In a user distribution table 210 according to the modification, "DIRECTION" represents an angular range when the direction in which the directivity can be adjusted by the transmission directivity control apparatus 401 of the second embodiment is equally divided into Q. The angular range is the same as a divided angular range described in the modification of the first embodiment. "DOWNLINK DATA RATE X NUMBER OF USERS" is a value calculated by adding the transmission powers of downlink transmission signals extracted by the arrival direction estimation/transmission power control units $403_1$ to $403_M$ for users present within each range.

FIGS. 15A and 15B show an example when the user distribution table 210 shown in FIG. 14 is divided into A and B tables. In an A table 211 shown in FIG. 15A and a B table 212 shown in FIG. 15B, "DIRECTION" and "DOWNLINK DATA RATE X NUMBER OF USERS" represent the same items as those in FIG. 14. The A table 211 shows a case in which a total of the downlink transmission powers of users present within each of Q divided angles is smaller than the threshold. The B table 212 shows a case in which a total of downlink transmission powers is larger than the threshold.

As described in the second embodiment and its modification, a null generation direction is selected in accordance with power actually transmitted to each user. This selection considers the power difference depending on the distance between users with the same data rate. Hence, interference with users who perform communication at low data rate with small transmission power is more efficiently suppressed.

<Third Embodiment>

The third embodiment adopts TDMA (Time Division Multiple Access) or FDMA (Frequency Division Multiple Access). TDMA and FDMA communications realize SDMA (Space Division Multiple Access) in which a plurality of users are spatially multiplexed onto the same time channel or same frequency channel by a directivity pattern.

Figure 16:
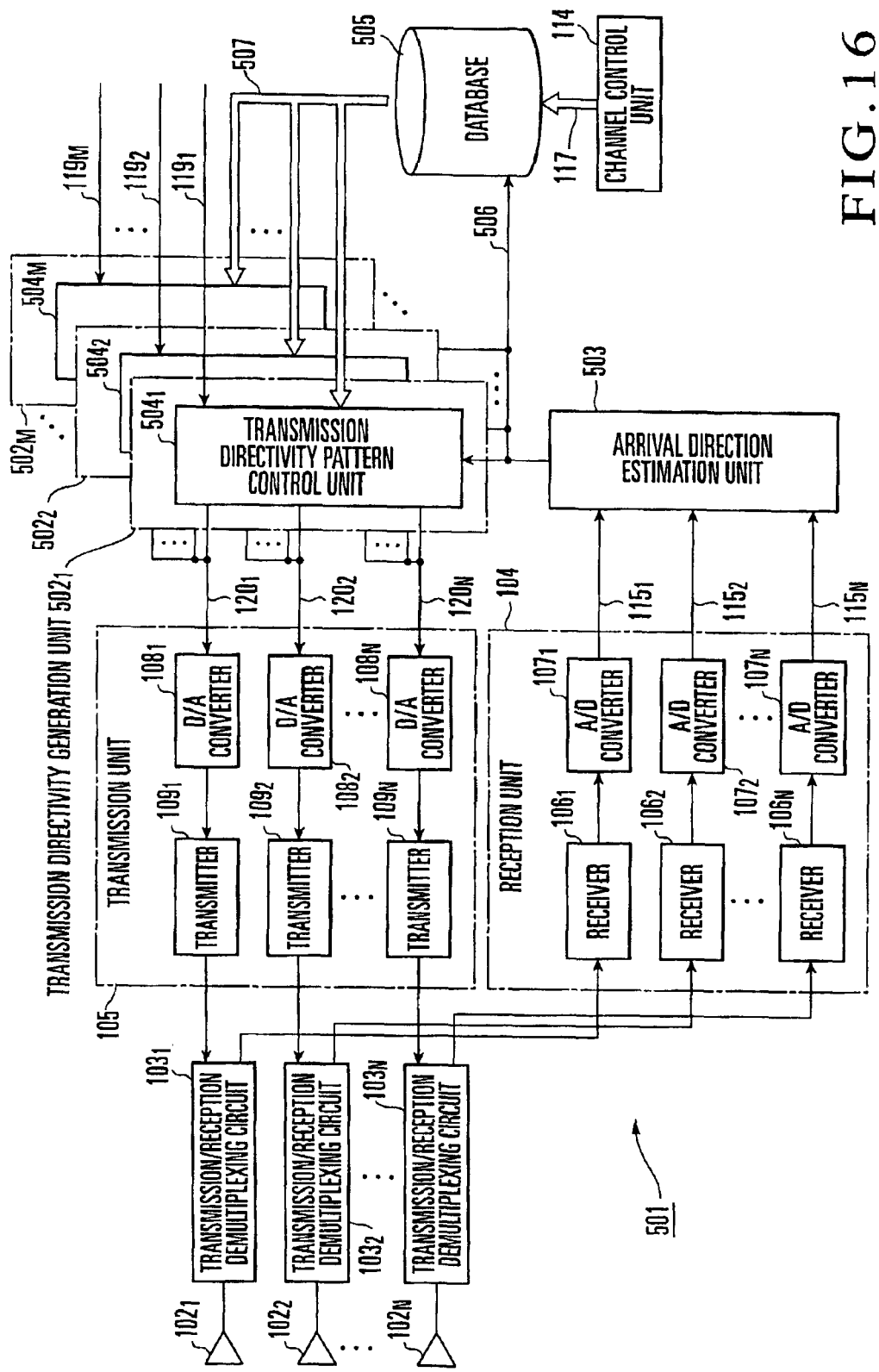
FIG. 16 is a block diagram showing a transmission directivity control apparatus in a radio base station using TDMA/FDMA according to the third embodiment of the present invention.

FIG. 16 shows a transmission directivity control apparatus in a radio base station using TDMA/FDMA according to the third embodiment of the present invention. In a transmission directivity control apparatus 501 of the third embodiment, the same reference numerals as in the transmission directivity control apparatus 101 of the first embodiment denote the same parts, their operations are substantially the same, and a detailed description thereof will be omitted.

In the third embodiment, transmission directivity generation units $502_1$ to $502_M$ replace the transmission directivity generation units $110_1$ to $110_M$ in the first embodiment. An arrival direction estimation unit 503 common to users replaces the arrival direction estimation units $111_1$ to $111_M$ of the first embodiment. The arrival direction estimation unit 503 does not have an arrangement of performing despreading for respective users and separating signals received by the antenna elements of a CDMA radio base station. For this reason, a spatially multiplexed uplink transmission signal is common to all the users.

The transmission directivity generation units $502_1$ to $502_M$ are respectively constituted by transmission directivity pattern control units $504_1$ to $504_M$ for controlling the transmission directivity patterns of the first to Mth users. The output of the arrival direction estimation unit 503 is connected to a database 505 such as a magnetic disk which stores output data, and the transmission directivity pattern control units $504_1$ to $504_M$. The database 505 is connected to a channel control unit 114 for assigning a channel to the user, and the transmission directivity pattern control units $504_1$ to $504_M$.

The arrival direction estimation unit 503 is formed from a DSP having a CPU, a storage medium such as a ROM which stores a control program, and a RAM serving as a work memory. The arrival direction estimation unit 503 receives reception signals $115_1$ to $115_N$, and detects the directions of spatially multiplexed users by using the MUSIC algorithm.

The database 505 is made up of a CPU, a storage medium such as a ROM which stores a control program, and a RAM serving as a work memory. The database 505 performs predetermined control by a stored program method. The database 505 creates a data table from arrival directions $\theta_1$ to $\theta_M$, user identification numbers $U_1$ to $U_M$, and downlink channel data rates $R_1$ to $R_M$ of respective users. A null generation direction candidate 507 for each transmission directivity pattern is determined from the database. Data processing in the third embodiment is substantially the same as that in the first embodiment shown in FIG. 1, and a description thereof will be omitted.

Also when SDMA is realized, a database made up of the data rates (multiple values) of downlink time channels or frequency channels, and the directions of users multiplexed onto the same time slot or same frequency channel is created. A downlink transmission directivity pattern is determined using this database by the same processing as that in the first embodiment, and interference is efficiently suppressed on the downstream channel.

A signal prepared by multiplexing a downlink transmission power control signal onto the uplink transmission signal of each user can also be employed. The downlink transmission power of each user can also be extracted from this signal. With this arrangement, a database comprised of the transmission powers and arrival directions of users is created. A downlink transmission directivity pattern is created by the same processing as that in the second embodiment. Accordingly, interference is efficiently suppressed on the downstream channel.

<Other Modifications>

In the first embodiment, a null generation direction is selected at random from null generation direction candidates. When the transmission powers of radio terminals as null generation direction candidates are high, radio terminals with higher transmission powers can be sequentially selected to adjust the directivity pattern. In this case, if only a few radio terminals exhibit high transmission powers, the directivity pattern concentratedly directs nulls to the high-transmission-power radio terminals. Radio interference with the high-transmission-power radio terminals can be effectively suppressed. When the transmission powers of radio terminals as null generation direction candidates are low, radio terminals with lower transmission powers can be sequentially selected to adjust the directivity pattern. In this case, if only a few radio terminals exhibit low transmission powers, the directivity pattern concentratedly directs nulls to the low-transmission-power radio terminals. Radio interference with the low-transmission-power radio terminals can be effectively suppressed.

In the first embodiment, the protection area is set, and radio terminals outside the protection area are selected as null directions. A null generation direction candidate most different from the main beam direction can also be selected as a null direction. In this case, a decrease in the antenna gain of the main beam can be similarly reduced, and an increase in transmission power can be prevented.

The above-described embodiments have exemplified a transmission directivity control apparatus for controlling the transmission directivity. The present invention can also be applied to a reception directivity control apparatus for controlling the reception directivity. Even the reception directivity control apparatus exhibits a given relationship between the main beam and null of the reception directivity pattern with respect to a plurality of time-overlapping radio terminals. To generate the reception directivity pattern of a certain radio terminal, a main beam in a direction from which radio waves are most strongly received is directed to the radio terminal, and nulls in directions from which radio waves are weakly received are directed to the remaining radio terminals. The same directivity control as those in the first to third embodiments can be achieved by adopting a database using the reception powers or transmission rates of radio terminals received by the radio base station, and a reception directivity pattern control unit for generating a reception directivity pattern.

As has been described above, according to the present invention, when a group of high-transmission-power radio terminals is selected as null generation candidates, transmission directivity patterns having nulls toward the high-transmission-power radio terminals are generated. This suppresses interference with the high-transmission-power radio terminals, increases the ratio of signal power to interference power (SIR) in the high-transmission-power radio terminals, and reduces necessary transmission power. Controlling transmission power yields the effect of reducing transmission power to the high-transmission-power radio terminals, and suppressing interference with low-transmission-power radio terminals. When a group of low-transmission-power radio terminals is selected as null generation candidates, nulls are generated toward the low-transmission-power radio terminals. Interference with the low-transmission-power radio terminals can be suppressed. Since the directivity pattern is generated based on transmission power in transmission, the power difference depending on the distance between radio terminals with the same transmission rate can be considered.

The threshold is calculated by multiplying the average or mode of transmission power by a predetermined coefficient, and can flexibly cope with use environment conditions such as the number of users and the user distribution. For example, the average is first set as a default value, and perturbation is conducted to determine a threshold so as to minimize the average of total transmission power. The total transmission power is observed every day. As a result, interference can be optimally suppressed.

A protection area is set in the direction of a desired radio terminal, and no null is generated in the protection area. A decrease in the antenna gain of the main beam by null generation can be reduced, an increase in transmission power can be prevented, and interference with other radio terminals can be suppressed.

Radio terminals are selected at random to adjust the directivity pattern. This directivity pattern distributively weakens radio waves to many selected radio terminals. Radio interference with many radio terminals can be effectively suppressed. Even if the number of interference waves arriving at the radio base station exceeds the degree of freedom of the adaptive antenna, nulls equivalently having a depth to a certain degree are generated by generating transmission directivity patterns for a plurality of radio terminals. Radio interference with many radio terminals can be suppressed.

The use of a divided angular range can prevent concentrated selection of radio terminals in close directions with respect to directions in which a plurality of radio terminals exist. Close radio terminals are concentratedly selected to generate nulls in close directions. Nulls are distributively generated in many directions, which provides a more efficient effect over the entire distribution.

Since the transmission rate in transmission to a radio terminal is used, the transmission rate in assigning a channel can be easily exploited.

Since the reception directivity pattern is adjusted similar to the transmission directivity pattern, an effect corresponding to the reception directivity pattern can be attained.

What is claimed is:

1. A directivity control apparatus comprising:
   reception means for receiving signals from a plurality of radio terminals;
   transmission means for transmitting signals to the radio terminals;
   direction determination means for determining directions of the radio terminals viewed from said transmission means on the basis of the signals received by said reception means;
   group selection means for distributing, by using a threshold, transmission powers or downlink data transmission rates of radio terminals which transmit signals in a time-overlapping manner, thereby classifying the radio terminals into two groups, and then selecting a group having a smaller total number of radio terminals; and
   directivity pattern control means for controlling a directivity pattern on the basis of the directions of the radio terminals determined by said direction determination means so as to increase intensity of radio waves to a target transmission radio terminal and decrease the intensity of radio waves to other radio terminals which transmit signals in the time-overlapping manner and belong to a group selected by said group selection means.

2. An apparatus according to claim 1, wherein the threshold is so set as to minimize total transmission power of a base station.

3. An apparatus according to claim 2, wherein the threshold is a value calculated by multiplying, by a predetermined coefficient, an average of transmission powers or downlink data transmission rates adopted in transmitting signals by said transmission means.

4. An apparatus according to claim 2, wherein the threshold is a value calculated by multiplying, by a predetermined coefficient, a mode of transmission powers or downlink data transmission rates adopted in transmitting signals by said transmission means.

5. An apparatus according to claim 1, wherein said directivity pattern control means comprises
   protection area setting means for setting a predetermined angular range as a protection area for a target transmission radio terminal; and
   terminal selection means for selecting a radio terminal falling outside the protection area set by said protection area setting means from radio terminals belonging to the group selected by said group selection means.

6. An apparatus according to claim 5, wherein said directivity pattern control means further comprises weight calculation means for calculating an antenna weight so as to generate a main beam in a direction of the target transmission radio terminal and generate a null in a direction of the radio terminal selected by said terminal selection means.

7. An apparatus according to claim 1, wherein said directivity pattern control means selects a radio terminal at random from radio terminals selected by said terminal selection means, and controls the directivity pattern.

8. An apparatus according to claim 1, wherein said group selection means comprises
   distribution table creation means for creating a table which stores a relationship between transmission powers or downlink data transmission rates of the radio terminals and terminal directions output from said direction determination means;
   table division means for distributing the transmission powers or the downlink data transmission rates by using a threshold, thereby classifying the radio terminals into two groups;
   comparison means for comparing the total numbers of radio terminals belonging to the two divided groups; and
   null generation direction setting mean for setting nulls in directions of radio terminals belonging to a group having a smaller total number of radio terminals in accordance with a comparison result of said comparison means.

9. An apparatus according to claim 8, wherein
   said direction determination means estimates arrival directions of radio waves from the radio terminals on the basis of the signals received by said reception means, and
   said distribution table creation means creates a table which stores for the respective radio terminals a relationship between the transmission powers or the downlink data transmission rates of the radio terminals, and estimated terminal directions output from said direction determination means.

10. An apparatus according to claim 8, wherein
    said distribution table creation means creates a table which stores a relationship between angular ranges prepared by equally dividing, by a predetermined number, an entire angular range where all radio terminals to which said transmission means is to transmit signals exist, and sums of transmission powers or downlink data transmission rates of radio terminals present within each divided angular range, and
    said table division means distributes the sums into two groups by using a threshold, thereby classifying the radio terminals into two tables.

11. A directivity control apparatus comprising:
    reception means for receiving signals from a plurality of radio terminals;
    direction determination means for determining directions of the radio terminals viewed from said reception means on the basis of the signals received by said reception means;
    group selection means for distributing, by using a threshold, reception powers or uplink data transmission rates of radio terminals which receive signals in a time-overlapping manner, thereby classifying the radio terminals into two groups, and then selecting a group having a smaller total number of radio terminals; and
    directivity pattern control means for controlling a directivity pattern on the basis of the directions of the radio terminals determined by said direction determination means so as to increase intensity of radio waves to a target reception radio terminal and decrease the intensity of radio waves to other radio terminals which transmit signals in the time-overlapping manner and belong to a group selected by said group selection means.

* * * * *